United States Patent [19]

Murata et al.

[11] 4,143,472
[45] Mar. 13, 1979

[54] DISPLAYING MAGNETIC PANEL AND ITS DISPLAY DEVICE

[75] Inventors: Yasuzo Murata, Ninomiya; Takeo Yokoyama, Yokohama; Hiroshi Murata, Kamakura, all of Japan

[73] Assignee: Pilot Man-Nen Hitsu Kabushiki Kaisha, Tokyo, Japan

[21] Appl. No.: 865,550

[22] Filed: Dec. 29, 1977

[30] Foreign Application Priority Data

Apr. 11, 1977 [JP] Japan .................. 52-41164

[51] Int. Cl.² .......................... B43L 1/12
[52] U.S. Cl. ........................... 35/66
[58] Field of Search .............. 35/66; 346/21; 340/324 M

[56] References Cited

U.S. PATENT DOCUMENTS

| | | | |
|---|---|---|---|
| Re. 25,822 | 7/1965 | Tate | 35/66 |
| 3,011,854 | 12/1961 | Allen | 346/21 |
| 3,322,482 | 5/1967 | Harmon | 340/324 M X |
| 3,982,334 | 9/1976 | Tate | 35/66 |

Primary Examiner—Harland S. Skogquist
Attorney, Agent, or Firm—Sughrue, Rothwell, Mion, Zinn and Macpeak

[57] ABSTRACT

A display device is disclosed which employs a magnetic panel. The magnetic panel is formed by two oppositely arranged substrates at least one of which is transparent or semi-transparent. The space between the two substrates is filled with a dispersing liquid having a yielding value higher than 5 dyne/cm². The dispersing liquid is prepared with fine magnetic grains, a coloring agent, a dispersing medium, and a fine grain thickener. Preferably, a multi-cell structure is provided in the space between the two substrates and the substrates are sealed to the multi-cell structure to form a plurality of independent display cells. A displaying magnet in the form of a pen is used to form a display by causing the fine magnetic grains to migrate to the front of the magnetic panel. An erasing magnet is slidably disposed at the rear of the magnetic panel.

13 Claims, 15 Drawing Figures

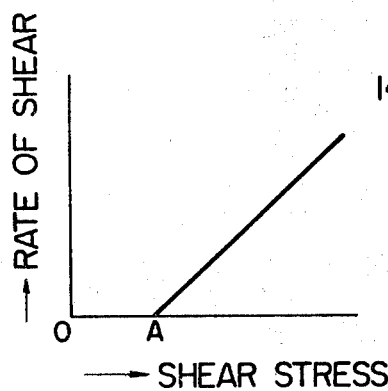
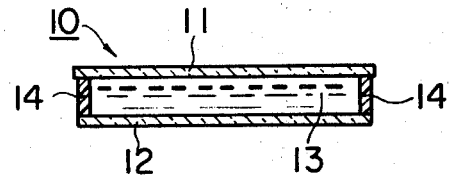
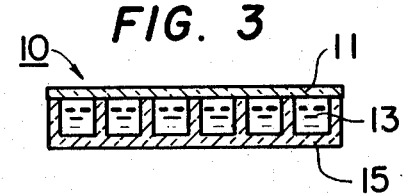
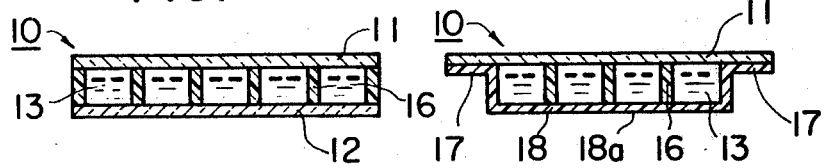
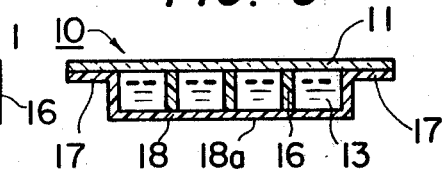
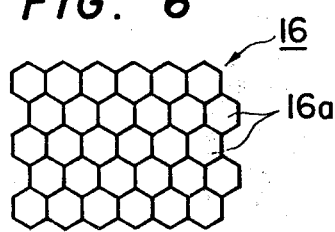
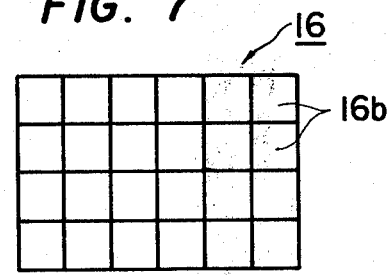
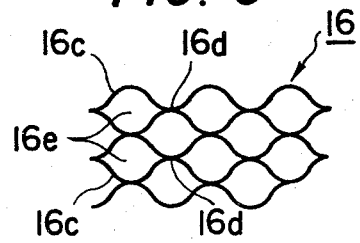

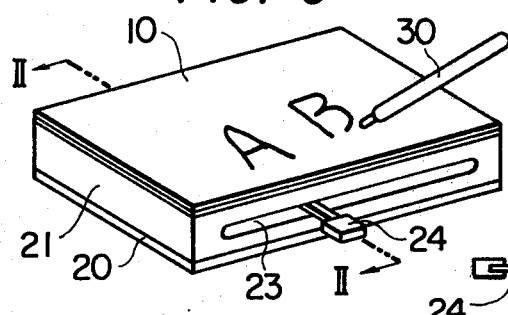
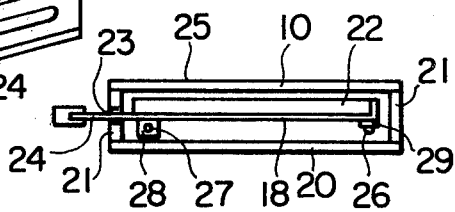
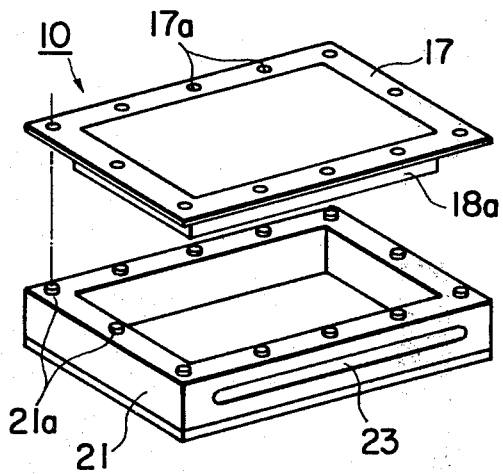
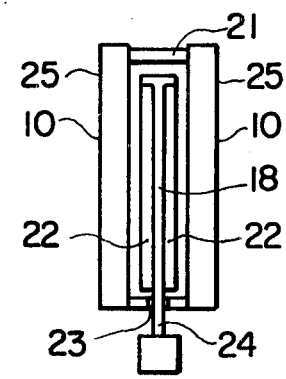
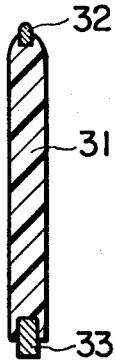
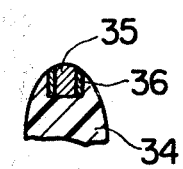
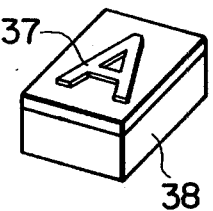

DISPLAYING MAGNETIC PANEL AND ITS DISPLAY DEVICE

BACKGROUND OF THE INVENTION

This invention relates to a magnetic panel in which by applying a magnetic field to a dispersing liquid having a predetermined yielding value in which magnetic fine grains are dispersed, the magnetic fine grains migrate in the dispersing liquid thereby forming a clear record display or erasing it, and to a display device utilizing the magnetic panel.

Several methods of providing a display by utilizing magnetic fields are known in the art. For instance, a method is disclosed by U.S. Pat. No. Re. 25,822 in which balls each having semi-spheres which are colored differently and magnetized are placed in the respective pockets, and the balls are turned with a magnetic tip to make a display. U.S. Pat. No. 3,103,751 discloses a method in which magnetic pins placed in respective bores are moved toward the front side by using a magnetic stylus to make a display. Furthermore, U.S. Pat. Nos. 2,853,830 and 2,589,601 disclose a method in which magnetic fine grains are collected on the front side by using a magnetic pen. U.S. Pat. No. 3,322,482 discloses a system in which a magnetic field is applied to a liquid in which magnetic flakes are suspended so as to align the flakes in parallel thereby forming a display. In U.S. Pat. No. 3,229,281, a magnetic field is applied to a liquid in which magnetic fine grains are suspended to cause the magnetic fine grains to migrate, so that a part of the magnetic fine grains to which the magnetic field is applied is increased in concentration thereby forming a display.

SUMMARY OF THE INVENTION

A first object of this invention is to provide a magnetic panel in which a liquid in which at least magnetic fine grains are sealed between two substrates, and upon application of a magnetic field to the liquid a display having high contrast and high tone as in a black display on a white background is made in a desired pattern, and a display device utilizing the magnetic panel.

A second object of the invention is to provide a magnetic panel in which only when a magnetic field greater than a predetermined value is applied thereto, the magnetic fine grains migrate instantly thereby forming a display along the locus of the applied magnetic field, and a display device utilizing the magnetic panel.

A third object of the invention is to provide a magnetic panel having a simple construction, in which a display formed by application of a magnetic field is not erased even if the magnetic field is removed, and a display device utilizing the magnetic panel.

A fourth object of the invention is to provide a magnetic panel having a simple construction, in which a display formed can be erased completely, and a display device utilizing the magnetic panel.

A fifth object of the invention is to provide a magnetic panel in which a fine display can be made or can be erased under adverse conditions, and a display device utilizing the magnetic panel.

With a magnetic panel obtained by sealing a dispersing liquid which is prepared merely by suspending magnetic fine grains in a dispersing medium between two substrates, upon application of a magnetic field to the front side of the panel, the magnetic fine grains are attracted to only a part of the front side where the magnetic field is applied to form a display. However, in this case, the display is blurred because even magnetic fine grains which receive an extremely small magnetic field are also attracted. Furthermore, since the specific gravity of the magnetic fine grains is much greater than that of the dispersing medium, upon removal of the magnetic field, the attracted magnetic fine grains are abruptly precipitated from the front side of the magnetic panel to the rear side, as a result of which the display disappears; that is, it is impossible to stably maintain the display. Thus, the objects of the invention cannot be achieved by this magnetic panel.

If the viscosity of the dispersing medium is increased in order to prevent the precipitation of the magnetic fine grains, the migration of the magnetic fine grains is decreased and thixotropy appears. As a result, the property of matter changes, and it is difficult to obtain a stable, fine display. Thus, it is impossible to achieve the objects of the invention with the display panel.

If the specific gravity of the dispersing medium is allowed to approach that of the magnetic fine grains by adding a material which increases the specific gravity of the dispersing medium, then the precipitation of the magnetic fine grains is decreased; however, the magnetic fine grains will be precipitated over a long period of time. Furthermore, as the magnetic fine grains which have received a small magnetic field are also attracted to the front side of the magnetic panel, the display is blurred. In addition, the obtained display is caused to disappear upon application of an extremely light impact. Therefore, the objects of the invention cannot be achieved by the provision of this magnetic panel.

As will be appreciated, it is absolutely necessary to prevent the precipition of the magnetic fine grains, and furthermore it is also necessary to control the magnetic response migration of the magnetic fine grain within a suitable range; however, these two requirements are contradictory.

The most specific feature of the invention, resides in that in order to overcome the above-described difficulties, a fine grain thickener is employed, whereby the yielding value of a dispersing liquid in which magnetic fine grains are dispersed is adjusted to be higher than 5 $dyne/cm^2$. According to this specific feature, in the case of a magnetic panel of this invention, upon application of magnetic field to the front side thereof with a magnet, the magnetic fine grains which have received a magnetic field greater than a predetermined value are caused to migrate to the front side of the magnetic panel to form a display, and when a magnetic field is applied to the rear side of the magnetic panel with a magnet, the magnetic fine grains are migrated to the rear side, as a result of which the display on the front side disappears. The inventor has found that, in order that magnetic fine grains having a greater specific gravity are held stably at a particular position in the dispersing liquid in which the magnetic fine grains have been dispersed and the magnetic fine grains are moved only when a magnetic field greater than a predetermined value is applied thereto, satisfactory results cannot be obtained even if the viscosity of the dispersing liquid is merely adjusted, or even if a dispersion stabilizer or protection colloid is employed, or even if the specific gravity of the dispersing medium is made to be equal to that of the magnetic fine grains. In addition, the applicant has found that satisfactory performance can be obtained only when the yielding value of the dispersing liquid is within a particular range. Furthermore, the applicant has reached a conclusion through study that the satisfactory result can be obtained by using a magnetic panel in which a dispersing liquid whose yielding value is adjusted to be equal to or higher than 5 dyne/cm$^2$ with a fine grain thickener is sealed between two substrates. When the yielding value is lower than 5 dyne/cm$^2$, a display formed on the magnetic panel by application of magnetic power is blurred at all times. In addition, as the magnetic fine grains are abruptly precipitated, the display may be erroneously read or illegible, and furthermore it disappears completely with the lapse of time.

This drawback is most significant in the case where a magnetic fine grain dispersing liquid obtained without adding a fine grain thickener, i.e., a magnetic fine grain dispersing liquid having a yielding value of 0 dyne/cm$^2$, is employed. This tendency is decreased as the yielding value is increased by adding the fine grain thickener. Only when the dispersing liquid is made to have a yielding value higher than 5 dyne/cm$^2$, a very clear, high-contrast display can be obtained, and yet displaying and erasing are very simple. The formed display is not erased even if the magnetic field is removed; however, it can be completely erased by applying a magnetic field to the side of the magnetic panel opposite to the display side.

Thus, the invention relates to a magnetic panel in which a dispersing liquid is sealed between two substrates, the dispersing liquid having a yielding value higher than 5 dyne/cm$^2$ is prepared by adding a fine grain thickener into a dispersing medium in which magnetic fine grains and, if necessary, a coloring agent are dispersed, and to a display device comprising this magnetic panel, and a magnet to apply a magnetic field thereto.

The nature, principle and utility of the invention will become more apparent from the following detailed description and the appended claims when read in conjunction with the accompanying drawings.

BRIEF DESCRIPTION OF THE DRAWINGS

In the drawings:

FIG. 1 is a graphical representation indicating the relationship between the rate of shear and the shear stress for a description of the yielding value of a dispersing liquid employed in this invention;

FIG. 2 is a sectional view showing one example of a magnetic panel in which a dispersing liquid is sealed between two substrates;

FIG. 3 is a sectional view illustrating a first modification of the magnetic panel shown in FIG. 2;

FIG. 4 is a sectional view showing a second modification of the magnetic panel;

FIG. 5 is a sectional view showing a third modification of the magnetic panel;

FIGS. 6 through 8 are partial plan views showing multicell structures each having a number of separate or independent cells, and being placed in the liquid sealing space of the magnetic panel;

FIG. 9 is a perspective view showing a display device in which a magnetic panel and a pen-shaped magnet are employed in combination, and an erasing magnet is slidably provided on the rear substrate of the magnetic panel;

FIG. 10 is a sectional view taken along line II—II in FIG. 9;

FIG. 11 is an explored perspective view showing the magnetic panel and its rectangular frame;

FIG. 12 is a sectional view showing a modification of the display device shown in FIG. 9;

FIG. 13 is a sectional view showing a suitable example of the pen-shaped magnet;

FIG. 14 is a sectional view showing an essential portion of a pen-shaped magnet having a tip most suitable for making a display on the display device; and FIG. 15 is a perspective view of a printing tool having a figure or character made of magnetic material on the surface.

DETAILED DESCRIPTION OF THE PREFERRED EMBODIMENTS

The term "yield value" as used in this invention means the lowest stress required to cause a liquid to flow. This is indicated by the stress at point A in the flow curve shown in FIG. 1. If the relationship between the rate of shear and the shear stress, i.e., the viscosity, of the dispersing liquid before adding the thickener is as represented by the dotted line, then it will be understood that the effect of adding the thickener is to displace the curve to the right so that it intercepts the adscissa at point A. Thus, basically once the yield value has been exceeded, the viscosity of the liquid is substantially unchanged. According to the invention, the value of point A is greater then 5 dyne/cm$^2$.

Shown in FIG. 2 is a first example of a magnetic panel 10. A dispersing liquid 13 is put betsween a front substrate 11 and a rear substrate 12, and it is sealed therebetween with a sealing plate 14 provided along the perpheral portion of these two substrates.

In a second example of the magnetic panel 10 shown in FIG. 3 instead of the rear substrate 14 shown in FIG. 2, a multicell substrate 15 is employed which has a number of independent or separate sells in which the dispersing liquid 13 is put, and a front substrate 11 is bonded to the multi-cell substrate 15. In this magnetic panel, the multi-cell substrate 15 may be employed as the substrate on the front side or on the rear side. The substrate 15 can be fabricated by etching a metallic plate, or by locally melting a photo-sensitive resin plate, or by subjecting a plastic plate to extrusion molding.

In a third example of the magnetic panel 10 shown in FIG. 4, a multi-cell plate 16 having a number of independent or separate small cells in the form of through-holes is bonded to a rear substrate 12, and after the dispersing liquid 13 is in the small cells of the multi-cell plate 16, a front substrate 11 is bonded to the multi-cell plate 16.

A fourth example of the magnetic panel 10 is shown in FIG. 5. A cup-shaped substrate 18 has a marginal portion 17 around its peripheral poriton and a recessed portion 18a at the central portion. The multi-cell plate 16 is placed in the recessed portion 18a, and the dispersing liquid 13 is put in the cells of the multi-cell plate 16. Therefore, a substrate 11 is placed over the multi-cell plate 16 and the substrate 18, and then the marginal portion 17 is bonded to the substrate 11. In this example, the substrate 18 may be used as the substrate on the front side or on the rear side.

The multi-cell plate 16 shown in FIGS. 4 and 5 may be constituted by honeycomb-shaped cells 16a as shown in FIG. 6 or by cells whose sections are rectangular as shown in FIG. 7. Alternatively, as shown in FIG. 8, corrugated plates 16c are piled one on another in such a manner that the protruded portions 16d of a corrugated plate 16c are bonded to the protruded portions 16d of the adjacent corrugated plate 16c thereby forming the cells 16e.

After the surface of the rear substrate of the magnetic panel thus formed is scanned with a magnet to apply a magnetic field to the dispersing liquid so as to attract the magnetic fine grains toward the rear side, a magnet is moved along the surface of the front substrate. In this case, the magnetic fine grains in the dispersing liquid attracted toward the rear side are instantaneously attracted toward the front side following the movement or locus of the magnet, as a result of which contrast occurs in the dispersing liquid. If this operation is repeatedly carried out, displaying and erasing records on the magnetic panel can be repeatedly effected.

A variety of materials can be used in this invention as a fine particulate thickener that is added to a dispersion medium to provide it with a high yield value. Most suitable examples include fine powdered silicic scid and silicate such as silicic anhydride, hydrated silicic acid, hydrated calcium cilicate, hydrated aluminum silicate, silica powder, diatom earth, caoline, hard clay, soft clay, bentonite and organic bentonite with can be used independently or in combination; alumina, micro fine calcium carbonate, slightly ground powdered calcium carbonate, micro fine activated calcium carbonate, heavy calcium carbonate, basic magnesium hydrate, barium sulfate and benzidine yellow. These fine powdered thickeners can be used individually or in combination. The amount to be used varies slightly depending upon the kind of the dispersion medium and the thickeners themselves, but in general, adding 2% or more of a thickener gives a polar dispersion medium a yield value higher than 5 dyne/cm$^2$, and so does the addition of 0.5% or more of a thickener to a non-polar dispersion medium.

A dispersion which has a high molecular substance, metal soap, surfactant or an organic gelatinizing agent dissolved or dispersed in a dispersion medium to give the medium a high yield value is thixotropic and so sensitive to the temperature that its physical properties can easily change, with the result that the magnetic fine particles contained therein become inactive and sedimentation occurs.

A colorant selected from white pigment, yellow pigment and other dyestuffs or pigments is added to a magnetic fine particles suspending dispersion so as to provide it with shielding properties and a color tone to thereby increase the contrast between the color of the display formed by the magnetic fine particles and the background.

The use of less than 10%, preperably less than 3%, of the colorant on the basis of the dispersion gives a sufficient increase in the contrast between the dispersion and the magnetic fine particles to permit reading of a sharp display. If the colorant is excessively used, the display portion formed by the magnetic fine particles becomes less distinct. No colorant need be added if the fine particulate thickener has reasonable shielding properties as well as a color tone giving high contrast with the magnetic fine particles.

The dispersion medium to be used in this invention may be polar or non-polar. Representative examples of a polar dispersion medium which may be used in the practice of the invention include water, alcohols, glycols, esters, ethers, ketones, and various hydrocarbons such as aliphatic solvents, aromatic solvents and chlorine-containing solvents. Representative examples of a non-polar disportion medium which may be used in the practice of the invention include certain organic solvents and oils such as plant oil, animal oil, mineral oil or synthetic oil.

Examples of suitable magnetic fine particles which can be used in this invention include magnetic oxide materials such as black magnetite, $\gamma$-hematite, chromium dioxide, and ferrite, and magnetic metal materials made of alloyed metals based on, for example, iron, cobalt or nickel, and granulated forms of these particles. If necessary, these fine particles may be adjusted for their color tone.

The smaller the size of the magnetic fine particles, the less active the magnetic force of a magnetic pen or the like, and as a result, the magnetic fine particles migrate so slowly that they come to be suspended in the dispersion medium, thus providing a defaced magnetic panel. Table 1 shows the results of the test for mark formation and erasure using a magnetic panel. The panel was fabricated in the following manner: Multiple separate through-cells were provided in a plate 1.3 mm thick. A transparent substrate was attached onto one side of the thus prepared multi-cell plate. The individual cells were filled with a dispersion containing various sized magnetic fine particles and having a yield value of 30 dyne/cm$^2$. A substrate was also attached to the other side of the multi-cell plate to seal the dispersion between the two substrates.

Table 1

| Type of magnetic fine particles | Results of recording and erasure test |
|---|---|
| magnetic panel using dispersion medium comprising Fe$_3$O$_4$ particles having diameter of less than 5 $\mu$ | Fewer particles were attracted by the magnetic pole, and most particles remained suspended in the intermediate region of individual cells. The entire panel was defaced and not suitable for practical use. |
| magnetic panel using dispersion medium comprising Fe$_3$O$_4$ particles granulated to have a diameter of 10 – 44 $\mu$ | The particles were not easily attracted by the magnetic pole, and some particles remained suspended in the intermediate region of individual cells. The appearance of the entire panel was slightly spoiled, but the image quality was good. Slight decrease in the contrast was observed. |
| magnetic panel using dispersion medium comprising Fe$_3$O$_4$ particles granulated to have a diameter of 44 – 149 $\mu$ | Migration was sufficiently good to enable complete recording and erasure. No defacement of the panel was observed. Both image quality and contrast |

Table 1-continued

| Type of magnetic fine particles | Results of recording and erasure test |
|---|---|
| | were satisfactory. |
| magnetic panel using dispersion medium comprising stainless powder of 44 - 149 μ diameter | Migration was sufficiently good to enable complete recording and erasure. No defacement of the panel was observed. Due to the color of the stainless powder, both the image quality and contrast were slightly impaired. |

As table 1 shows, the magnetic fine particles preferably have a diameter of greater than 10 μ. In a certain cases, the the magnetic fine particles having a diameter of smaller than 5 μ can be used and the particles having a diameter of smaller than 10 μ can be also used. Even if their size is smaller than 10 μ, the magnetic fine particles may agglomerate in a dispersion to provide an apparent diameter of greater than 10 μ. If such case occurs, an advantageous result is often achieved. The most preferred size ranges from 10 to 200 μ.

Granulation of the magnetic fine particles to have an apparent size in a specified range by blending them with a resin solution followed by either drying and griding or spraying and drying and provides a sharper display. The resin solution may be replaced by inorganic materials such as gypsum and water glass. The granulated magnetic fine particles are also referred to as the magnetic fine particles in this invention.

Of the two opposite substrates that form a magnetic panel, the substrate on the front side where a display is read is preferably made of a transparent material, but depending on the practical application, it may be made of a translucent material. In either case, a variety of plastics and glass can be employed. It is not necessarily required that the other substrate on the rear side be made of a transparent material, and various plastics, glass and metals can be employed. These plastics and glass may or may not be colored. It is on the other hand necessary to prevent leakage of the dispersion from between the two substarates. For this purpose, the gap between the two substrates may be filled with sealing plates placed at their edges, or a bonding agent may be used to fix each substrate to the multi-cell plate, or the substrates may be fused to each other at their marginal ends edges.

The space between the two substrates for enclosing the dispersion may be properly changed according to the specific purpose, but for providing a sharp display with high contrast and for effecting desired erasure, they may be spaced by a distance of 0.3 to 20 mm, most preferably from 0.5 to 2.0 mm. The amount of the magnetic fine particles to be contained in the dispersion is preferably 10 parts or more on the basis of 100 parts of the dispersion medium. Using less amount of the particles tends to result in a discontinuous, broken display.

The arrangement of multiple independent small cells between two substrates and having a dispersion sealed within each cell provides a sharp image of an extremely high contrast as compared with a magnetic panel having no such cells but merely sealing a dispersion between two substrates. The image thus provided is very stable and retains its quality for a long period under the severest conditions. The cross section of each cell may be circular, semi-circular of polygonal. The thinner the partition wall that separates one cell from another, the better display having sufficient continuity can be obtained. The partition wall preferably has a thickness of less than 0.5 mm. The two substrates of the multi-cell structure may be preformed, or a multi-cell unit made of metal, plastics, paper, etc. may be disposed between the two substrates. It is desired that the multi-cell unit be bonded to the substrates by means of a bonding agent because in so doing, the dispersion is completely sealed within each cell. Examples of advantages bonding agents are an epoxy adhesive, polyurethane adhesive, and vinyl adhesive.

A display magnetic panel may be prepared by incorporating a dispersion of said magnetic fine particles in cells so arranged as to provide picture elements, for example a seven segment alpha-numeric display, cells so arranged as to provide a dot matrix, or cells so arranged as to provide characters or geometrical patterns.

This invention also relates to a display device comprising the above described display magnetic panel and a magnet for causing migration of the magnetic fine particles contained in the dispersion. A permanent magnet or an electromagnet may be used as the magnet. The function of both display and erasure may be achieved by one magnet, but for ease of handling, it is preferable that a separate erasure magnet is slidably disposed on the rear side of the panel. Of course, an erasure magnet having a relatively large surface may be used to effect full or partial erasure. In any event, the minimum requirement for the erasure magnet that can be used in this invention is that it is capable of attracting those magnetic fine particles on a displayed area that is no longer needed.

Shown in FIGS. 9 and 10 is one concrete example of a display device utilizing the above-described magnetic panel. The magnetic panel 10 is mounted on a rectangular frame 21 which forms a box with a flat plate 20. An erasing permanent magnet 22 is placed in the space defined by the rectangular frame 21 in such a manner that it confronts the rear substrate. A operating lever 24 attached to the magnet 22 extends through a guide slit 23 formed in the rectangular frame 21 along the moving direction of the magnet 22, so as to facilitate the slidable movement of the magnet 22. The front substrate employed as a display section 25 is transparent of semi-transparent.

In this example, in order to smoothly slide the magnet 22, two guide rods 26 and 27 lie across the space in the rectangular frame 21 and in parallel with the rear substrate with the two ends of each rod fixedly secured to the rectangular frame. A block 28 and a supporting plate 29 are fixedly secured to the rear surface of the holding portion 18, and the guide rod 27 is inserted into the block 28, while the guide rod 26 is brought into contact with the supporting plate 29. The length of the magnet 22 should be long enough to cover at least the display section 25.

In the case where the magnetic panel 10 shown in FIG. 5 is coupled to the rectangular frame 21, as shown in FIG. 11 a plurality of through-holes 17a are formed in the marginal portion 17 which is the peripheral portion of the magnetic plate 10, while a plurality of protrusions 21a are provided on the rectangular frame 21 in correspondence to the plurality of through-holes 17a. The protrusions 21a are engaged with the thourgh-holes 17a so that the recessed portion 18a of the substrate 18 is placed in the rectangular frame 21. The engagement may be made by way of an adhesive or a screw.

With the display device thus formed, a magnetic field is applied to the dispersing liquid by sliding the erasing permanent magnet 22 with the operating lever 24, as a result of which the magnetic fine grains can be attracted toward the rear side of the magnetic panel 10. Then, if a pen-shaped magnet is moved on the surface of the display section 25, the magnetic fine grains in the dispersing liquid which have been attracted toward the rear side are attracted toward the display side instantaneously following the locus of the pen-shaped magnet, as a result of which contrast occurs in the dispersing liquid to display the locus.

Another example of the display device is shown in FIG. 12, in which display or writting can be effected on the two surfaces thereof and an erasing magnet is provided inside. In this example, instead of the flat plate 20 fixedly secured to the rectangular frame 21 of the display device shown in FIGS. 9 or 10, another magnetic panel 10' is provided. More specifically, two magnetic panels 10 and 10' are spaced apart from each other through the rectangular frame 21, or are placed on two sides of the rectangular frame 21. The magnet holding portion of the operating lever 24 is modified so that an erasing permanent magnet 22' confronting the rear side of the magnetic panel 10' is additionally provided; that is, the magnet holding portion holds two permanet magnets 22 and 22' so that the erasing magnets are slidably moved between the magnetic panels 10 and 10'. The substrate on the front side of each display section 25 is transparent or semi-transparent.

The contacting surface of a display magnet needs to be adjusted according to the specific object, and generally, a magnet having a diameter of 1-3 mm is preferred. A magnet having a diameter in the order of 10-80 mm may be preferred for writing big characters. One big problem in the use of a display magnet is the presence of an unnecessary leak of magnetic flux which attracts more magnetic fine particles than are necessary and provides an indistinct written display. The best way to solve this problem is to use a display magnet unit having the magnetic portion surrounded with, for example, a yoke made of a fero-magnetic material. Another effective means of representation is a printing device that has a magnet shaped into a character, symbol or a geometrical figure. Examples of other applicable methods or devices are to effect recording by applying current through a pen-shaped electromagnet instead of a pen-shaped permanent magnet; a printing device that uses a magnetic plate having such patterns as geometrical figures and characters due to an electromagnet; a pen-shaped magnet that is modeled after a Japanese writing brush and employs a hairy magnetic material; and a recording device that combines a magnetic pattern having a magnetic shield with a permanent magnet or an electromagnet.

For erasing the display on the magnetic panel described above, the pen-shaped magnet may also be used as the erasing magnet. However, if its erasing surface is substantially of the order of a displayed line, it is difficult to erase the displayed line. Shown in FIG. 13 is one example of a pen-shaped magnet suitable for erasing. In this example, a displaying magnet 32 having a round contact surface which is brought into contact with the magnetic panel is provided at one end of a holder 31, while an erasing magnet 33 whose contact surface is larger than at least that of the displaying magnet 32 so as to be able to erase displays is provided at the other end of the holder 31. With this pen-shaped magnet, it is possible not only to write heavy letters but also to readily erase displayed lines because the contact surface of the magnet 33 which is brought into contact with the magnetic panel is larger than that of the displaying magnet 32.

The displaying magnet 32 described above is disadvantageous in that it is difficult to machine it, and it is liable to be broken when dropped, and in addition it is difficult to maintain its strength. Shown in FIG. 14 is a pen-shaped magnet which overcomes the above-described difficulties accompanying the displaying magnet 32 and which permits a free selection of writing angle. A displaying magnet 35 and a cylindrical yoke 36 clamping both sides of the displaying magnet 35 are embedded in one end portion of a holder 34, and the display magnet 35 and the cylindrical yoke 36 together with the end portion of the holder 34 are rounded to form a spherical surface at the end of the holder 34. In this case, it can be readily machined, lines can be drawn in desired directions, a writing angle can be selected as desired, and the sliding condition of the displaying magnet and accordingly the holder is improved. Furthermore, as unnecessary magnetic flux leakage is not produced by the yoke 36, only the magnetic fine grains corresponding to the sectional area of the magnet 35 are attracted, as a result of which clear writing and displaying can be obtained. Thus, the pen-shaped magnet is suitable for writing extremely thin lines. However, for displaying lines having greater width, it is not always necessary to provide the yoke 36.

FIG. 15 illustrates a printing tool 38 like a stamp in which a figure or character 37 made of a permanent magnet is provided on the surface. The figure or character can be readily displayed by bringing the printing tool 38 into contact with the magnetic panel.

In any of the examples described above, if two magnetic poles of the magnetic fine grains are colored differently, a two-color display can be obtained by selecting the magnetic pole of the recording magnet.

The magnetic panel and the display device according to the invention are considerably useful as they can be widely applied as toys for infants, teaching equipment, writing boards, various game boards, memorandum boards, record displaying boards, blackboards, whiteboards, dustless displaying boards, advertizing boards, POP boards, or under-water record displaying boards utilizing a recording and erasing system in which recording is effected without using liquid ink, being completely stable against water.

Now, various examples for a detailed description of the magnetic panel according to the invention will be described; however, it should be noted that the invention is not limited thereby or thereto.

EXAMPLE 1

Ninety-eight parts of Isopar M (trademark of Humble Oil & Refining Co. for an isoparaffin solvent), 1.25 parts of Aerosil-200 (trademark of Degussa, Inc. for a fine powder silicic acid) and one part of Tipaque CR-50 (titanium oxide made by Ishihara Sangyo K.K.) were kneaded with a T.K. homomixer (which is a wet type dispersing machine made by Tokushukika Kogyo K.K.) to obtain a white liquid.

40 parts of Toda Color KN-320 (which is a magnetite made by Toda Kogyo K.K.), and 25 parts of 40% methylethylketone of Epo-Tohto YD-017 (which is a solid epoxy resin made by Toto Kasei K.K.) were kneaded to obtain a mixture. The mixture thus obtained was subjected to drying and grinding to obtain 30 parts of 100-325 mesh black magnetic fine grains. The magnetic fine grains were mixed and dispersed in the white liquid described before to obtain a dispersing liquid.

The yielding value of this dispersing liquid was 6.3 dyne/cm$^2$. A multi-cell plate 1.3 mm in thickness was provided. The sectional area of each cell was 4 mm square, and the wall thickness was 0.075 mm. The dispersing liquid was sealed in the cells by covering both surfaces of the multi-cell plate with polyester films 0.1 mm in thickness. Thereafter, the peripheral portion of the multi-cell plate was fixed with an epoxy adhesive to form a magnetic panel.

EXAMPLE 2

A magnetic panel was made similarly as in Example 1 with the exception that 1.5 parts of Aerosil-200 was used. The yielding value of the dispersing liquid was 10.9 dyne/cm$^2$.

EXAMPLE 3

A magnetic panel was made similarly as in Example 1 with the exception that 1.75 parts of Aerosil-200 was used. The yielding value of the dispersing liquid was 20.2 dyne/cm$^2$.

EXAMPLE 4

A magnetic panel was made similarly as in Example 1 with the exception that 2.0 parts of Aerosil-200 was used. The yielding value of the dispersing liquid was 35.0 dyne/cm$^2$.

EXAMPLE 5

A magnetic panel was made similarly as in Example 1 with the exception that 4.0 parts of Aerosil-200 was used. The yielding value of the dispersing liquid was 81.9 dyne/cm$^2$.

EXAMPLE 6

Eighty-two parts of Isopar M, 1.5 parts of Aerosil-200, and 0.8 part of Tipaque CR-50 were kneaded with the T.K. momomixer to obtain a white liquid.

Thirty parts of Toda Color KN-320, 8 parts of Polysol SH-502 (which is a vinyl acetate resin emulsion made by Showa Kobunshi K.K.) and eight parts of water were kneaded to prepare a mixture. This mixture was subjected to drying and grinding to obtain 16 parts of 100-325 mesh black magnetic fine grains. The magnetic fine grains thus obtained were mixed and dispersed in the aforementioned white liquid to obtain a dispersing liquid.

The yielding value of the dispersing liquid was 30.0 dyne/cm$^2$. A multi-cell plate 1.4 mm in thickness, the sectional area of each cell being 4 mm square, was provided a substrate having a recessed portion at the central part and a flange along its peripheral portion was provided. The multi-cell plate was bonded to the recessed portion of the substrate to fabricate a container. The dispersing liquid was put in the container, and then the other surface of the container was covered with a vinyl chloride resin sheet coated with an epoxy adhesive to completely seal the dispersing liquid therein. Thereafter, the peripheral portion of the container was subjected to high-frequency welding to fabricate a magnetic panel.

EXAMPLE 7

After 85 parts of Isopar M and 15 parts of Benzidine Yellow had been kneaded with the T.K. homomixer, 30 parts of the same magnetic fine grains as those employed in Example 1 were mixed and dispersed to obtain a dispersing liquid.

The yielding value of the dispersing liquid was 13 dyne/cm$^2$. A multi-cell plate 1.5 mm in thickness of the type shown in FIG. 3 as plate 15, the sectional area of each cell being 4 mm square, the thickness of a wall between adjacent cells being 0.02 mm, was provided. The dispersing liquid was put in the cells. The other surface of the multi-cell plate was covered with a polypropylene film 0.2 mm in thickness by using a urethane adhesive and the peripheral portion of the multi-cell plate covered with the polypropylene film was subject to heat sealing, thereby fabricating a magnetic panel.

EXAMPLE 8

One hundred parts of mineral spirit, 6 parts of Silnex P-52 (which is a fine powder silicate made by Mizusawa Kagaku Kogyo K.K.) and one part of Tipaque CR-50 were kneaded with the T.K. momomixer to prepare a white liquid. Then, 24 parts of MRM-400 (which is a γ-hematite made by Toda Kogyo K.K.) and 30 parts of 20% aqueous solution of Gohsenol GM-14 (which is a polyvinylalcohol made by Nippon Goseikagaku Kogyo K.K.) were kneaded with three rolls to prepare a mixture. The mixture was subjected to drying and grinding to obtain 23 parts of 100-250 mesh brown magnetic fine grains. The brown magnetic fine grains were mixed and dispersed in the aforementioned white liquid to obtain a dispersing liquid.

The yielding value of the dispersing liquid was 13.4 dyne/cm$^2$. Similarly as in the case of Example 7, the dispersing liquid was sealed in the cells of the multi-cell plate to fabricate a magnetic plate. The other surface of the multi-cell plate was covered with a vinyl chloride sheet by using an epoxy adhesive and the peripheral portion of the multi-cell plate covered with teh vinyl chloride sheet was subject to high frequency welding, thereby fabricating a magnetic panel.

EXAMPLE 9

First, 100 parts of mineral spirit, 3 parts of aluminum oxide C (which is an aluminum oxide made by Nippon Aerosil K.K.), and 0.1 part of Seikafast yellow-200 (which is a yellow pigment made by Dainichi Seika Kogyo K.K.) were kneaded by the T.K. homomixer to to prepare a mixture. Then, 30 parts of the same magnetic fine grains as those used in Example 1 were mixed and dispersed in the mixture thus prepared to obtain a dispersing liquid.

The yielding value of the dispersing liquid was 26 dyne/cm$^2$. Similarly as in the case of Example 1, the dispersing liquid was put in the cells of the multi-cell plate. Thereafter, the peripheral portion of the multi-cell plate was fixed with an urethane adhesive to form a magnetic panel.

EXAMPLE 10

First, 100 parts of toluene, 3 parts of S-Ben (which is an organic bentonite made by Hojun Yoko Co.), one part of Tipaque CR-50, and 0.2 part of A110 Red (which is a red pigment made by Dainichi Seika Kogyo K.K.) were kneaded with the T.K. homomixer to prepare a mixture. Then, 40 parts of 100–325 mesh stainless powder was mixed and dispersed in the mixture to prepare a dispersing liquid.

The yielding value of the dispersing liquid was 33.6 dyne/cm$^2$. Similarly as in the case of Example 1, the dispersing liquid was sealed in the cells of the multi-cell plate to provide a magnetic panel.

EXAMPLE 11

First, 50 parts of water 50 parts of ethylene glycol, 10 parts of Aerosil-200, and 2.5 parts of Tipaque yellow TY-50 (which is a yellow pigment made by Ishihara Sangyo K.K.) were thoroughly kneaded in a container with an agitating bar to prepare a yellow liquid. Then, 30 parts of MRMB-450 (which is a magnetite made by Toda Kogyo K.K.) and 40 parts of 20% toluene solution of Acrypet VK-001 (which is a methacrylic resin made by Mitsubishi Rayon K.K.) were kneaded with three rolls to prepare a mixture. The mixture was subjected to drying and grinding to obtain 25 parts of 100–250 mesh black magnetic fine grains. The magnetic fine grains thus obtained were mixed and dispersed in the aforementioned yellow liquid to prepare a dispersing liquid.

The yielding value of the dispersing liquid was 42 dyne/cm$^2$. Similarly as in the case of Example 1, the dispersing liquid was sealed in the cells of the multi-cell plate to ptovide a magnetic panel.

EXAMPLE 12

First, 100 parts of water, 10 parts of Airosil-200, and one part of Tipaque R-550 were kneaded in a container with an agitating bar to prepare a white liquid. Then, 36 parts of stainless powder (100–325 mesh), 9 parts of Tipaque R-550, 3 parts of A110 Red, and 15 parts of 40% methylethylketone solution of Epo-Tohto YD-014 (which is a solid epoxy resin made by Toto Kasei K.K.) were kneaded to prepare a mixture. The mixture was subjected to drying and grinding to obtain 35 parts of 100–325 mesh red magnetic fine grains. The magnetic fine grains thus obtained were mixed and dispersed in the aforementioned white liquid to obtain a dispersing liquid.

The yielding value of the dispersing liquid was 39.5 dyne/cm$^2$. Similarly as in the case of Example 1, the dispersing liquid was sealed in the cells of the multi-cell plate to fabricate a magnetic panel.

EXAMPLE 13

First, 100 parts of Isopar M100, 14 parts of soft calcium carbonate, and one part of Tipaque CR-50 were kneaded by the T.K. homomixer to prepare a mixture. Then, 30 parts of the same magnetic fine grains as those employed in Example 1 was mixed and dispersed in the mixture thus prepared to obtain a dispersing liquid.

The yielding value of the dispersing liquid was 14.7 dyne/cm$^2$. Similarly as in the case of Example 1, the dispersing liquid was sealed in the cells of the multi-cell plate to provide a magnetic panel.

Then, a magnetic panel in which a dispersing liquid having no yielding value was sealed was provided. The dispersing liquid was obtained by dispersing only the magnetic fine grains in a colored dispersing agent in which a coloring agent was dissolved or dispersed. In addition, a magnetic panel in which a dispersing liquid was sealed was provided. This dispersing liquid was made up of magnetic fine grains, a dispersing agent, a fine grain thickener, and a coloring agent and had a yielding value less than 5 dyne/cm$^2$. These panels thus provided were compared with the magnetic panels according to the invention. In all of the magnetic panels, a multi-cell plate 1.3 mm in thickness having separate or independent cells, each cell being in the form of a through hole, the sectional area of each cell being 4 mm square, and two surfaces of the multi-cell plate were covered with transparent polyester films.

REFERENCE EXAMPLE 1

To 100 ml of distilled water wherein 1 g of sodium hexametaphosphate was dissolved was added 10 g of a fine powder of anatase-type titanium dioxide and 4 g of chromium dioxide followed by blending in a ball mill to obtain a dispersion. The dispersion thus obtained was distributed among the individual cells of a multi-cell plate. A polyester film was bonded to both sides of the multi-cell plate with an epoxy adhesive to provide a magnetic panel.

REFERENCE EXAMPLE 2

To a solution of 170 g of polystyrol in 500 ml of benzene was added 200 g of γ-hematite and 100 g of titanium dioxide, and blended in a ball mill to prepare a paste. While a magnetic field was applied to the paste in a given direction, the paste was dried and cured. The solid product was ground by a grinder to produce fine powdered magnetic particles. A mixture of 0.3 g of an oil blue dyestuff and 0.1 g of cobalt naphthenate was dissolved in 100 ml of tetrafluorodibromo ethane (specific gravity of 2.18). To the solution was added 7 ml of olive oil and 8 g of the previously prepared magnetic particles, and mixed in a paint shaker to produce a dispersion. The dispersion was used to make a magnetic panel in the same manner as in Reference Example 1.

REFERENCE EXAMPLE 3

A sample of 100 g of Isopar M (isoparaffin solvent) was mixed with 1 g of titanium dioxide and 25 g of granulated ferrosoferric oxide having a particle size of 44–149 μ in a homomixer to prepare a dispersion. According to the same method as used in Reference Example 1, a magnetic panel was prepared using this dispersion.

REFERENCE EXAMPLE 4

To 100 g of Isopar M were added 1 g of titanium dioxide, 25 g of granulated ferrosoferric oxide having a particle size of 44–149 μ, and 0.75 g of Aerosil-200, and mixed in a homomixer to prepare a dispersion. According to the same method as used in Reference Example 1, a magnetic panel was prepared using this dispersion.

REFERENCE EXAMPLE 5

To 100 g of Isopar M were added 1 g of titanium dioxide, 14 g of ferrosoferric oxide granulated to have a particle size of 44–149 μ, and 1 g of Aerosil-200, and mixed in a homomixer to prepare a dispersion. A magnetic panel was prepared using this dispersion according to the same method as used in Reference Example 1.

Measurement of the yielding values was carried out according to a direct method with a Brook Field BL viscometer (made by Tokyo Keiki K.K.). The method is as follows: The rotor of the viscometer is immersed into the dispersing liquid, and only the dispersing liquid is allowed to move around the rotor at a very slow rate of 0.2 r.p.m. without rotating the rotor. In this case, the spring of the rotor is twisted, as a result of which both the rotor and the dispersing liquid are turned. However, when the rotor is twisted to a certain angle, the dispersing liquid is caused to slide along the rotor. At this time, the angle of torsion of the rotor is measured. The yielding value is obtained through conversion from the angle of torsion of the rotor, the constant torsion of the spring of the rotor, and the configuration and area of the rotor. The converting equations are as follows:

| Rotor Number | Yielding Value |
|---|---|
| No. 1 rotor | $0.168\, \theta$ |
| No. 2 rotor | $0.840\, \theta$ |
| No. 3 rotor | $3.360\, \theta$ | where $\theta$ is the angle of torsion of the rotor measured.

Displays which were recorded at a recording speed 25 cm/sec with a permanent magnet corresponding to MPB 380 in JIS C2502 were visually observed. A difference in brightness between the color of the entire panel and the display recorded according to the same method as that for determining the clearness of display was visually observed.

Recording was carried out by applying a sufficient magnetic field to the panel, and the panel was allowed to stand still. In a certain period of time, the sedimentation velocity of the magnetic fine grains was visually observed. In addition, the sedimentation velocity of the magnetic fine grains obtained when the panel on which recording has been carried out similarly was vibrated manually (with a frequency of once per second and an amplitude of 200 mm) was visually observed. The density of a display recorded by changing the magnetic field applied to the panel (the amount of magnetic fine grains allowed to migrate) was visually observed.

Table II shows the performance of the magnetic panels prepared according to this invention and those prepared in the above Reference Examples.

Table II

| Items tested Specimen | Yield value of dispersion (dyne/cm²) | minimum strength of magnetic field at which magnetic particles start to move | display retention of (sedimentation of magnetic particles) |
|---|---|---|---|
| Ex. 1 | 6.3 | all particles started to move as soon as the strength exceeded 0.04 KG. | no sedimentation occurred at either stationary or vibrational condition. Display was stable. |
| Ex. 2 | 10.9 | all particles started to move as soon as the strength exceeded 0.05 KG. | " |
| Ex. 3 | 20.2 | all particles started to move as soon as the strength exceeded 0.06 KG | " |
| Ex. 4 | 35.0 | all particles started to move as soon as the strength exceeded 0.08 KG | " |
| Ex. 5 | 81.9 | all particles started to move as soon as the strength exceeded 0.2 KG | " |
| Ref. Ex. 1 | 0 | less than 0.001 KG | 30 seconds after recording, sedimentation of the particles occurred and display disappeared. |
| Ref. Ex. 2 | 0 | less than 0.001 KG | degree of sedimentation of the particles occurred under vibrational condition, and display became less distinct. |
| Ref. Ex. 3 | 0 | less than 0.001 KG | 30 seconds after recording, almost all particles formed sediment and display disappeared. |
| Ref. Ex. 4 | 1.5 | less than 0.01 KG | some degree of sedimentation occurred under vibrational condition, and display became less distinct. |
| Ref. Ex. 5 | 2.5 | " | slight sedimentation of the particles occurred under vibrational condition, and display became slightly dull. |

| | Sharpness of display | Contrast between display and background | migration of the magnetic particles |
|---|---|---|---|
| Ex. 1 | sharp display obtained | clear | good |
| Ex. 2 | " | " | " |
| Ex. 3 | " | very clear | very good |
| Ex. 4 | very sharp display obtained | " | " |
| Ex. 5 | " | " | " |
| Ref. Ex. 1 | since sedimentation occurred very soon, only a broken and dull display was obtained for a very short period. | repetition of recording and erasure resulted in some defacement of the background. | the particles showed good migration, but soon enough, sedimentation occurred to give low density. |
| Ref. Ex. 2 | broken and rough display obtained. | repetition of recording and erasure resulted in defaced and indistinct background. | the particles were not easily attracted by the magnetic pole. They remained dispersed throughout the solution. |
| Ref. Ex. 3 | dull display obtained | repetition of recording | the particles showed good |

Table II-continued

| | | | |
|---|---|---|---|
| | only for a short period. | and erasure resulted in some defacement of the background. | migration, but soon enough, sedimentation occurred to give low density. |
| Ref. Ex. 4 | only dull display obtained | " | " |
| Ref. Ex. 5 | dull, discontinued and broken display obtained. | repetition of recording and erasure resulted in slight defacement of the background. | " |

As is apparent from the above-described results, the magnetic panels fabricated by sealing in the dispersing liquid having a yielding value higher than 5 dyne/cm$^2$ showed excellent performance. Thus, the magnetic panels according to the invention are considerably useful.

What is claimed is:

1. A displaying magnetic panel which comprises: a liquid containing panel having two oppositely arranged substrates at least the display section of which is transparent or semi-transparent and a liquid sealing space between said two substrates; and a dispersing liquid having a yielding value higher than 5 dyne/cm$^2$ sealed in said space, said dispersing liquid prepared with fine magnetic grains, a coloring agent, a dispersing medium, and a fine grain thickener which is selected from the group consisting of fine powder silicic acid, fine powder silicate, fine powder alumina, fine powder calcium carbonate and fine powder magnesium carbonate.

2. A displaying magnetic panel as claimed in claim 1, in which a multi-cell structure having a number of cells each having an independent space is provided in said liquid sealing space.

3. A displaying magnetic panel as claimed in claim 2, in which said multi-cell structure is of a plurality of honeycomb cores.

4. A displaying magnetic panel as claimed in claim 3, in which said honeycomb cores are made of metal, synthetic resin or fiborous sheet.

5. A displaying magnetic panel as claimed in claim 2, in which said multi-cell structure is bonded to said substrates with an adhesive.

6. A displaying magnetic panel as claimed in claim 1, in which said fine magnetic grains are of black magnetite, γ-hematite, chromium dioxide, ferrite, iron, cobalt or nickel, or are obtained by granulating these materials into fine grains.

7. A display device which comprises: a magnetic panel having a liquid containing panel having two oppositely arranged substrates at least the display section of which is transparent or semi-transparent and a liquid sealing space between said two substrates, and a dispersing liquid having a yielding value higher than 5 dyne/cm$^2$ sealed in said liquid sealing space, said dispersing liquid prepared with fine magnetic grains, a coloring agent, a dispersing medium, and a fine grain thickener which is selected from the group consisting of fine powder silicic acid, fine powder silicate, fine powder alumina, fine powder calcium carbonate and fine powder magnesium carbonate; and a displaying magnet for causing the fine magnetic grains to migrate in said dispersing liquid to form a display.

8. A display device as claimed in claim 7, further comprising an erasing magnet slidably provided on a surface of said magnetic panel which is not a displaying surface thereof.

9. A display device as claimed in claim 8, in which said displaying magnet and said erasing magnet are electromagnets.

10. A display device as claimed in claim 7 in which said displaying magnet is a pen-shaped magnet which is obtained by embedding the base of a magnetic substance in an end portion of a holder and by rounding a contact surface of said magnetic substance, which is brought into contact with said magnetic panel, together with the surface of the end portion of said holder.

11. A display device as claimed in claim 7, in which said displaying magnet is a printing tool on the surface of which a figure or character made of permanent magnets is provided.

12. A display device as claimed in claim 7, further comprising an erasing magnet and said displaying magnet and erasing magnet are held in a pen-shaped magnet holder, said displaying magnet having a round contact surface which is brought into contact with said magnetic panel at one end portion of said holder, and said erasing magnet at the other end portion of said holder, the contact surface of said erasing magnet, which is brought into contact with said magnetic panel, being greater than said displaying magnet provided at said one end portion of said holder.

13. A display device which comprises: two magnetic panels each having a liquid containing panel having two oppositely arranged substrates at least the display section of which is transparent or semi-transparent and a liquid sealing space between said two substrates, a dispersing liquid having a yielding value higher than 5 dyne/cm$^2$ sealed in said liquid sealing space, said dispersing liquid prepared with fine magnetic grains, a coloring agent, a dispersing medium, and a fine grain thicker which is selected from the group consisting of fine powder silicic acid, fine powder silicate, fine powder alumina, fine powder calcium carbonate, and fine powder magnesium carbonate, said two magnetic panels being arranged in such a manner that surfaces thereof which are not displaying surfaces are confronted with each other and there is a predetermined distance between said two magnetic panels; an erasing magnet slidably provided between said two magnetic panels; and a displaying magnet for causing the fine magnetic grains to migrate in said dispersing liquid to form a display.

* * * * *